United States Patent [19]

Anelli et al.

[11] Patent Number: 4,725,122
[45] Date of Patent: Feb. 16, 1988

[54] OPTICAL FIBER CABLE WITH HYDROGEN COMBINING MATERIAL THEREIN

[75] Inventors: Pietro Anelli, Milan; Gianfranco Colombo, Sesto San Giovanni, both of Italy

[73] Assignee: Societa'Cavi Pirelli S.p.A., Milan, Italy

[21] Appl. No.: 899,948

[22] Filed: Aug. 25, 1986

Related U.S. Application Data

[63] Continuation-in-part of Ser. No. 723,901, Apr. 16, 1985, Ser. No. 798,598, Nov. 15, 1985, Pat. No. 4,688,889, and Ser. No. 846,576, Mar. 31, 1986.

[30] Foreign Application Priority Data

Aug. 30, 1985 [IT] Italy ................................ 22022 A/85

[51] Int. Cl.[4] ............................................. G02B 6/44
[52] U.S. Cl. ................................................. 350/96.23
[58] Field of Search ........................ 350/96.23, 96.34; 174/70 R, 70 S

[56] References Cited

FOREIGN PATENT DOCUMENTS

| | | | |
|---|---|---|---|
| 2087589 | 5/1982 | United Kingdom | 350/96.23 |
| 2106266 | 4/1983 | United Kingdom | 350/96.23 |
| 2144559 | 3/1985 | United Kingdom | 350/96.23 |
| 2149935 | 6/1985 | United Kingdom | |

*Primary Examiner*—William L. Sikes
*Assistant Examiner*—Frank González
*Attorney, Agent, or Firm*—Brooks Haidt Haffner & Delahunty

[57] ABSTRACT

Optical fibers of an optical fiber, telecommunication cable are protected with respect to hydrogen by including in the cable a mixture of molybdenum trioxide and a catalyst selected from the transition metals, the inorganic and organic compounds of the transition metals and the organometallic acids of the transition metals, such mixture being used by itself or being supported by inert materials. The mixture may surround the fiber or fibers, be applied as a coating on a component of the cable, be incorporated in a component of the cable or be included in a rod or tube adjacent to the fiber or fibers and within the cable sheath.

18 Claims, 10 Drawing Figures

OPTICAL FIBER CABLE WITH HYDROGEN COMBINING MATERIAL THEREIN

This application is a continuation-in-part of application Ser. No. 723,901 (still pending), filed Apr. 16, 1985 and entitled "Optical Fiber Cable with Hydrogen Combining Layer", of application Ser. No. 798,598, filed Nov. 15, 1985 (now Pat. No. 4,688,889 issued on Aug. 25, 1987) and entitled "Hydrogen Fixing Fillers for Optical Fiber Cables and Components and Cables and Components Containing Such Filler", and Ser. No. 846,576 (still pending), filed Mar. 31, 1986 and entitled "Hydrogen Absorbing Composition for Optical Fiber Cables and Cables Containing Such Composition", all of such applications being assigned to the assignee of the present application.

The present invention relates to an optical fiber communication cable and in particular, to an optical fiber telecommunication cable of the type in which the optical fibers are protected against the damage caused by the hydrogen.

It is known that when gaseous hydrogen comes into contact with an optical fiber, the transmitted signals suffer an attenuation which is irreversible and which compromises the transmission capacity of the cable.

The hydrogen may form within a cable by evolving from the component materials when these latter have absorbed it during the making thereof. Another reason for which the hydrogen may form within a cable is the consequence of chemical reactions which can occur among the component materials and water traces, in liquid or gaseous state, which have penetrated into the cable itself.

Moreover, the hydrogen from outside the cable can reach the optical fibers of a cable through diffusion. In this case, the amount of hydrogen which can reach the optical fibers can be greater if the cable is disposed in an ambient rich in hydrogen.

In optical fiber cables, the protection with respect to hydrogen must be also assured efficaciously for the entire time during which the cable must operate which, as is known, is of the order of tens of years.

In the known cables, the protection of the optical fibers from hydrogen is obtained by the presence in them of a barrier formed by materials which physically absorb the hydrogen, such as, for instance, carbon fibers, palladium in the form of threads, glass charged with phosphorus and the like. Examples of known cables are described in the British patent application No. 2,144,559.

Considering that the amount of hydrogen which can be physically absorbed per unit of volume by the more active materials used in the known cables is rather limited, it is necessary that inside the cable there are great amounts of these materials in order to assure the protection of the optical fiber for the entire lifetime of a cable and this leads to unacceptable increases in the diametral dimensions of the cables themselves.

One object of the present invention is that of providing optical fiber cables in which the fibers are efficaciously protected from hydrogen for any operating lifetime without increasing the diametral dimensions of the cable for obtaining such result.

A further object of the present invention is an optical fiber telecommunication cable comprising a sheath enclosing at least one optical fiber, characterized by the fact of embedding a mixture comprising molybdenum trioxide and a catalyst selected from the transition metals, the inorganic and organic compounds of the transition metals, the organometallic acids of said transition metals both by themselves or supported on inert materials.

Other objects and advantages of the present invention will be apparent from the following detailed description of the presently preferred embodiments thereof, which description should be considered in conjunction with the accompanying drawings in which.

Figure 1:
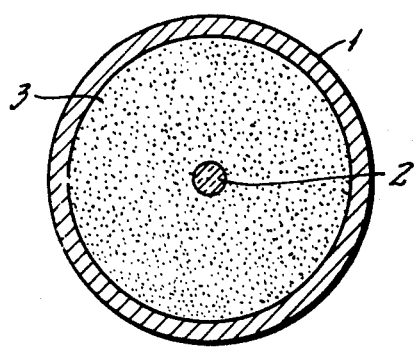
FIG. 1 is a cross-section of one embodiment of an optical fiber cable according to the invention.

Generally speaking, optical fiber telecommunication cables are provided with a sheath enclosing a structure generally called optical core which has at least one optical fiber therein, and said structure can assume several configurations. The sheath can have therearound protective layers, armors and other similar elements, the presence of which depends on the type of ambient in which the optical fiber cable is operated.

The present invention includes both land and submarine optical fiber cables having any configuration, either for the optical core or for the elements outside the sheath, but which have, as part thereof, the mixture defined hereinafter which is able to chemically block hydrogen independently of the manner by which said mixture is included in the cable.

The hydrogen absorbing mixture included in a cable according to the invention must have two essential components. One essential component is molybdenum trioxide. The other essential component is a catalyst selected from the transition metals, the inorganic and organic compounds of the transition metals, the organometallic acids of the transition materials, either by itself or supported in inert materials.

Examples of catalysts are powdered platinum, powdered palladium, powdered nickel, the organic or inorganic compounds of said metals, such as palladium acetate, palladium acetyl-acetonate, palladium hydroxide, palladium chloride and chloroplatinic acid either alone or supported on inert materials, such as, for example, charred bone or vegetable material known to those skilled in the art as "charcoal".

The amount of catalyst which can be used with the molybdenum trioxide may vary over a relatively wide range, but the amount used affects substantially only the speed of reaction of hydrogen with the molybdenum trioxide. Thus, with small effective amounts of the catalyst, the speed of reaction is relatively low, and as the amount of catalyst is increased, the speed of reaction increases but does not increase significantly when the catalyst quantity is more than 2.5 parts by weight per 100 parts by weight of molybdenum trioxide. Since the speed of reaction is not significant, at least when the amount of hydrogen involved is small, small amounts of catalyst can be used. The preferred range is from $1 \times 10^{-5}$ to 2.5 parts by weight of the catalyst per 100 parts by weight of moylybdenum trioxide, but smaller or greater amounts can be used. In all cases, the amount of catalyst will be less than the amount of molybdenum trioxide.

The amount of the mixture of the catalyst and the molybdenum trioxide to be included per unit length of cable depends upon the expected amount of hydrogen to be absorbed and hence, the amount of the mixture per unit length of cable can vary over a relatively wide range. Generally, the amount of the mixture per unit length of cable can be calculated or determined empirically and should be present in an amount sufficient to absorb the amount of hydrogen to which the cable is to be exposed. The amount of the mixture need not exceed 20 gm. per linear meter of cable, and a representative amount of the mixture per linear meter of cable is 0.3 gm. When the amount of hydrogen to which the cable is to be subjected for the life of the cable is in the range from a fraction of normal $cm^3$ up to 5 normal $cm^3$ per linear meter of cable, the preferred range of the mixture per linear meter of cable is from about 0.0025 to about 20 gm.

As previously stated, the optical fiber cables falling within the present invention are not subject to any limitation as to the manner in which the above-defined mixture is included in the cable.

For example, the mixture can be included by itself or constitute an additive to a filling material of the cable or to a compound of polymeric material forming one component of the cable enclosed in the sheath, or, if the sheath is constituted by a compound of plastic material, forming a component of the sheath.

The drawings illustrate, by way of example, some cables according to the invention.

The cable illustrated in FIG. 1 has a sheath 1 of metallic material or of a plastic compound. The sheath 1 encloses an optical fiber 2 and the space between them is filled with a mixture 3 according to the invention alone or by a filling material, for example, a petroleum jelly, a silicone grease and the like, in which a mixture according to the invention is dispersed.

Figure 2:
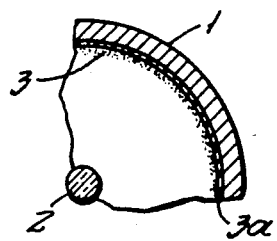
FIGS. 2 and 3 are fragmentary cross-sections of modifications of the embodiment shown in FIG. 1.

According to an alternative embodiment of the cable shown in FIG. 2, the mixture 3 covers only the inner surface of the sheath 1 and is bound to this latter through an adhesive 3a, such as, for example, a polyvinyl-ether, as illustrated in FIG. 2. The mixture, in powder form, may be merely applied to a layer of the adhesive previously applied to the inner surface of the sheath 1 or the catalyst and the molybdenum trioxide may be mixed with a polymeric material and reduced to a powder which is applied to such a layer of adhesive.

Figure 3:
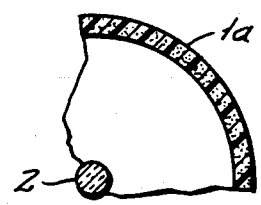

According to a further alternative embodiment of the cable of FIG. 1, the sheath 1a surrounding the optical fiber is made of a polymeric material compound, and the mixture is included in the sheath 1a constituting a component of the compound forming the sheath 1a as illustrated in FIG. 3.

Figure 4:
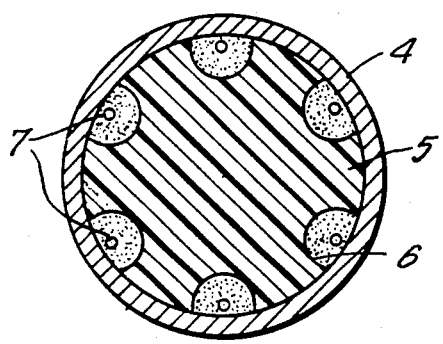
FIG. 4 is a cross-section of another embodiment of an optical fiber cable according to the invention.

FIG. 4 illustrates another embodiment of a cable according to the invention. As shown in FIG. 4, the cable has a sheath 4 of metallic material or of a polymeric material compound.

The sheath 4 encloses a shaped member 5, for example, of a polymeric material compound, having, on its outer surface, a plurality of grooves 6 which, longitudinally of the cable, have the configuration of a closed or open helix. The optical fibers 7 are loosely received in the grooves 6.

The sheath 4 closes the grooves 6, and the grooves 6 are filled with a filling material, for example, a petroleum jelly or a silicone grease in which the said previously defined mixture is dispersed.

Alternatively, in the cable of FIG. 4, the jelly or grease may be omitted and only the mixture of molybdenum trioxide and a catalyst fills the grooves 6.

Figure 5:
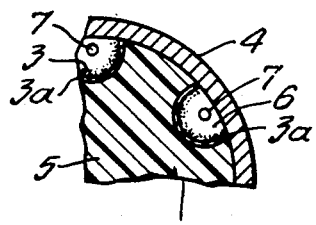
FIGS. 5 and 6 are fragmentary cross-sections of modifications of the embodiment shown in FIG. 4.

According to another alternative embodiment illustrated in FIG. 5, the mixture 3 covers the surfaces of the grooves 6 and is bonded to the groove surfaces by an adhesive 3a, for example, polyvinyl-ether.

Figure 6:
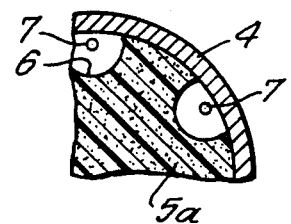

A further alternative embodiment illustrated in FIG. 6 has the mixture of molybdenum trioxide and the catalyst embedded in the polymeric material compound forming the shaped member 5 or, if the sheath 4 is a plastic sheath, the mixture can be embedded only in the compound forming said sheath, as illustrated in FIG. 3, or can be embedded in both the sheath and the member 5.

Other alternative embodiments of the cable will be apparent to those skilled in the art from the description of different alternative embodiments given hereinbefore.

Figure 7:
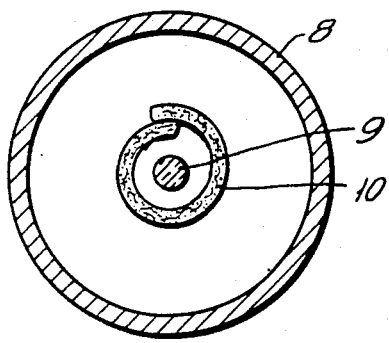
FIG. 7 is a cross-section of a further embodiment of an optical fiber cable according to the invention.

FIG. 7 illustrates a further alternative embodiment of a cable according to the invention. The cable shown in FIG. 7 has a sheath 8 of metallic material or of a polymeric material compound. The sheath 8 encloses an optical fiber 9. This latter is surrounded by a wrapping 10 formed by a tape having the previously defined mixture therein.

Figure 8:
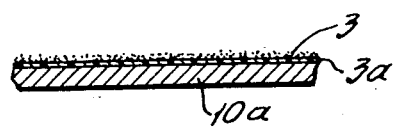
FIG. 8 is a fragmentary cross-section of a modified form of the tape which may be used in the embodiment shown in FIG. 7.

The tape forming the wrapping 10 can be of a metallic, plastic or textile material or of paper, and the manner by which said tape incorporates the mixture can be various. For example, instead of including the mixture in the tape, the tape can be covered on at least one of its faces by the above-defined mixture 3 which is bonded to the tape 10a by an adhesive 3a, for example, polyvinyl-ether, as illustrated in FIG. 8. The mixture can also be embedded in a film of plastic material, for example, polyethylene, superimposed on or laminated with the tape.

If the tape is of plastic material, the hydrogen absorbing mixture can be embedded in the tape itself constituting a component of the compound of polymeric material forming the tape.

In the case in which the tape forming the wrapping 10 is a textile material, such as a fabric tape or a non-woven fabric tape, or paper, the mixture impregnates the tape resulting in having the mixture enclosed in the meshes of the network of threads or of fibers forming the tape itself.

Figure 9:
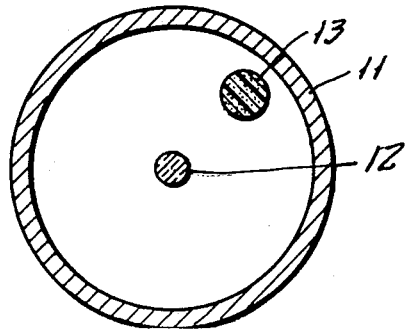
FIG. 9 is a cross-section of a still further embodiment of an optical fiber cable according to the invention.

A further alternative embodiment of a cable according to the invention is in FIG. 9. The cable shown in FIG. 9 has a sheath 11 of metallic or plastic material which encloses an optical fiber 12 and an elongated element, for example, a rod 13 of plastic material having the mixture as a component of the compound forming said rod 13.

The rod 13 extends alongside the optical fiber 12, and, if desired, but not necessarily, the space enclosed within the sheath 11 can be occupied by a filling material of a type known per se.

Figure 10:
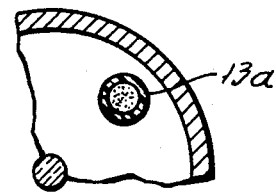
FIG. 10 is a fragmentary cross-section of a modification of the embodiment shown in FIG. 9.

According to an alternative embodiment illustrated in FIG. 10, a tube 13a of a polymer having a high permeability to hydrogen such as low density polyethylene or silicone rubber is substituted for the rod 13 and is filled with the mixture in question.

Experimental tests have been carried out with the previously defined mixture of molybdenum trioxide and a catalyst which chemically blocks the hydrogen, and on the components of cables according to the invention wherein said mixture is embedded, to determine the hydrogen absorption capacity.

The experimental tests have been carried out as follows:

The equipment used comprises a glass bulb of 175 cm$^3$, from which a glass tube which terminates with a two-way cock projects in sealed relation to the tube. One of the passages of the cock is connected to a vacuum pump and the other passage is connected to a phial containing hydrogen. At an intermediate position on the tube, there is inserted a mercury gauge.

Samples of cable components according to the invention (which will be specified later on) were introduced into the glass bulb. Subsequently, a barometric vacuum was effected within the glass bulb, the reaching of the vacuum being monitored by means of the mercury gauge.

At this point, the vacuum pump was excluded from communication with the tube and the glass bulb was put into communication with the phial containing the hydrogen so that this latter can flow into the glass bulb.

The tests were carried out at a temperature of 20° C., and an amount of hydrogen greater than that theoretically necessary for chemically saturating the mixture present in the sample under examination was introduced into the glass bulb and measured on the basis of the pressure of the hydrogen within the glass bulb itself. Then, the reduction of the hydrogen pressure within the glass bulb as a function of time was recorded, the corresponding amounts of hydrogen reacted for saturating 1 gram of the single samples and the time required to reach this result was determined.

Then, the amount, given in normal cm$^3$ per gram of mixture present in the single samples, of hydrogen chemically absorbed at saturation of the sample was calculated.

The experimental tests were carried out on the samples described hereinafter.

Sample A

This sample was constituted by 15 grams of powder of hydrogen absorbing mixture having the following composition:

| | |
|---|---|
| molydenum trioxide | 100 parts by weight |
| palladium supported on charcoal with a content of palladium of 5% | 1 part by weight |

To effect the test, the powder of the sample was placed into a glass basket introduced into the glass tube.

Sample B

This sample was constituted by 15 grams of a filling material having the following composition:

| | |
|---|---|
| petroleum jelly | 100 parts by weight |
| molybdenum trioxide | 10 parts by weight |
| palladium supported on charcoal with a content of palladium of 5% | 1 part by weight |

The weight content of the mixture able to chemically react with the hydrogen in this sample is 1.5 grams. To effect the test, the walls of the glass bulb were covered with the filling material in question.

Sample C

This sample was constituted by a rectangular small plate of plastic material, specifically of polyethylene, having sides of 20 mm and of 100 mm and a thickness of 1 mm.

The surfaces of the small plate was covered with an adhesive film constituted by polyvinyl ether that holds, on the surface of the plate, two grams of mixture having a composition the same as that of the sample A.

Sample D

This sample was constituted by a molded rectangular small plate with sides of 35 mm and of 200 mm and a thickness of 1 mm and made of a compound of plastic material having the following composition:

| | |
|---|---|
| polybutadiene 1,4 -cis | 100 parts by weight |
| paraffinic plasticizer oil | 10 parts by weight |
| molybdenum trioxide | 50 parts by weight |
| palladium acetate | 0.5 parts by weight |

The small plate which was introduced in the glass bulb contained 2.5 grams of the mixture able to react with the hydrogen.

Sample E

This sample was a square segment of 200 mm on a side of a weft and warp fabric of cotton threads impregnated with 3 grams of the following compound:

| | |
|---|---|
| natural rubber | 100 parts by weight |
| molybdenum trioxide | 50 parts by weight |
| palladium acetyl acetonate | 0.5 parts by weight |

The content of the mixture able to react with hydrogen of this sample was 1.5 grams.

Sample F

This sample was constituted by a square section 200 mm on a side of a cellulose paper having therein 0.5 gram of the following mixture:

| | |
|---|---|
| molybdenum trioxide | 100 parts by weight |
| palladium supported on charcoal with a content of 5% of palladium | 1 part by weight |

Sample G

This sample was a low density polyethylene tube, sealed at the ends and having a wall thickness of 0.2 mm, a diameter of 2 mm and a length of 1 mm entirely filled with the mixture having the composition of sample A.

The content of hydrogen reacting mixture in the sample was 9 grams.

The experimental results obtained with the above-described samples are set forth in the following table:

| Sample | Hydrogen amount saturating the sample in normal cm³ per 1 gram of sample | Time required to saturate a sample in hours | Hydrogen amount absorbed at saturation by the samples in normal cm³ per 1 gram of mixture present in samples |
|---|---|---|---|
| A | 77 | 1.5 | 77 |
| B | 7 | 24 | 75 |
| C | 34 | 5 | 76 |
| D | 25 | 2880 | 72 |
| E | 11 | 100 | 75 |
| F | 8.5 | 24 | 76 |
| G | 68 | 2.5 | 77 |

The experimental results given in the column 3 of the table show that all the samples are able to absorb, and to render chemically inactive, hydrogen in an amount practically equal to the theoretical saturation amount for the mixture which is about 77 normal cm³ per gram of mixture. This means that the mixture carries out its protective action independently of the manner in which it is present in the cable.

In fact, the manner in which the hydrogen absorbing mixture is effective involves substantially only the time required for reaching the saturation as shown by the values given in the second column, but said experimentally determined times are to be considered negligible when compared with the lifetime required for an optical fiber cable.

Moreover, since the amount of hydrogen that can be formed in an optical fiber cable during its required lifetime are of the order of some normal cm³ of hydrogen per meter of cable, it is evident from the experimental data that since in all the embodiments of cables according to the invention, the amounts of hydrogen that can be chemically absorbed is considerably greater than the amounts of hydrogen that can be expected, it is apparent that proper protection for the optical fibers can be obtained without any necessity of increasing the diametral dimensions of the cables to achieve said result.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. An optical fiber cable comprising a sheath enclosing at least one optical fiber and comprising a hydrogen absorbing mixture, said mixture comprising molybdenum trioxide and a catalyst, the amount of catalyst being less than the amount of molybdenum trioxide and said catalyst being selected from the group consisting of transition metals, inorganic and organic compounds of said transition metals, organometallic acids of said transition metals and mixtures thereof.

2. An optical fiber cable as set forth in claim 1, wherein said catalyst is selected from the group consisting of palladium acetate, palladium acetyl-acetonate, palladium hydroxide, palladium chloride, chloroplatinic acid and mixtures thereof.

3. An optical fiber cable as set forth in claim 1, wherein said mixture is intermediate said sheath and said optical fiber or fibers.

4. An optical fiber cable as set forth in claim 2, wherein said mixture further comprises a filling material.

5. An optical fiber cable as set forth in claim 2, wherein said mixture fills all otherwise empty spaces intermediate said sheath and said optical fiber or fibers.

6. An optical fiber cable as set forth in claim 1, wherein said mixture forms a layer on the inner surface of said sheath which is bonded to said inner surface by an adhesive.

7. An optical fiber cable as set forth in claim 1, wherein said sheath is made of a polymeric material having said mixtures therein.

8. An optical fiber cable as set forth in claim 1, further comprising an elongate member within said sheath having a plurality of longitudinally extending grooves at its outer surface and wherein at least one optical fiber is loosely disposed in each groove.

9. An optical fiber cable as set forth in claim 8, wherein said mixture is in said grooves.

10. An optical fiber cable as set forth in claim 8, wherein said elongate member is made of polymeric material having said mixture therein.

11. An optical fiber cable as set forth in claim 1, wherein said optical fiber is surrounded by a tape which includes said mixtures and which is within said sheath.

12. An optical fiber cable as set forth in claim 11, wherein said tape has a layer of said mixture on at least one surface thereof, said layer being bonded to said tape by an adhesive.

13. An optical fiber cable as set forth in claim 11, wherein said tape is made of a polymeric material having said mixture therein.

14. An optical fiber cable as set forth in claim 11, wherein said tape is made of a fibrous material impregnated with said mixture.

15. An optical fiber cable as set forth in claim 1, further comprising an elongate member extending alongside said optical fiber or fibers and longitudinally within said sheath, said elongate member containing said mixture.

16. An optical fiber cable as set forth in claim 15, wherein said elongate member is a tube of polymeric material selected from the group consisting of low density polyethylene and silicone rubber and wherein said tube has said mixture therewithin.

17. An optical fiber cable as set forth in claim 1, wherein the amount of the catalyst is in the range from about $1 \times 10^{-5}$ to about 2.5 parts by weight per 100 parts by weight of the molybdenum trioxide in the mixture.

18. An optical fiber cable as set forth in claim 17, wherein the amount of molybdenum trioxide and catalyst per linear meter of cable is in the range from about 0.0025 to about 20 gm.

* * * * *